United States Patent [19]

Di Matteo et al.

[11] 4,335,962

[45] Jun. 22, 1982

[54] METHOD AND APPARATUS FOR DETERMINING SPATIAL INFORMATION

[75] Inventors: Paul Di Matteo, Huntington; Joseph A. Ross, Fort Salonga, both of N.Y.

[73] Assignee: Robotic Vision Systems, Inc., Melville, N.Y.

[21] Appl. No.: 59,199

[22] Filed: Jul. 20, 1979

[51] Int. Cl.³ .............................................. G01B 11/24
[52] U.S. Cl. ................................... 356/376; 250/558; 356/375
[58] Field of Search ................................ 356/375–376, 356/388–389, 393, 397, 1–2, 152; 250/558; 364/564

[56] References Cited
PUBLICATIONS

Idesawa et al., "Scanning Moire Method & Automatic Measurement of 3-D Shapes", App. Optics, 8-1977, pp. 2152-2162.

Will et al., "Grid Coding: A Novel Technique for Image Processing", Proc. IEEE, vol. 60, 6-1972, pp. 669-680.

*Primary Examiner*—William H. Punter

[57] ABSTRACT

A method and apparatus for determining spatial information regarding the points on an object situated in an object space wherein substantially planar laterally spaced diverging radiant energy beams are applied to the object space and a recording means records the reflected radiant energy in such space from a position whereat the radiant energy from points in the space and along the radiant energy beams is uniquely defined.

9 Claims, 17 Drawing Figures

METHOD AND APPARATUS FOR DETERMINING SPATIAL INFORMATION

BACKGROUND OF THE INVENTION

This invention pertains to the examination of objects and, more particularly, to the determination of spatial information regarding the surface points of such objects.

Heretofore, a variety of techniques have been developed for determining the spatial position of points on the surface of an object. One rather old technique is to apply substantially planar diverging radiant energy beams to the object and to monitor or record the confrontations of these beams with the object surface.

It is an object of the present invention to provide an improved method and apparatus for determining spatial information related to the surface points of an object.

SUMMARY OF THE INVENTION

In accordance with the principles of the present invention, the above and other objectives are realized in a practice wherein an object space having defined forward and rearward extents is provided and is subjected to substantially planar laterally spaced diverging radiant energy beams and wherein a recording means is provided for recording the radiant energy reflected from objects in the object space and the recording means is positioned so that the reflected radiant energy receivable from all illuminated points in the object space is uniquely defined. In preferred form, the desired uniqueness of the receivable radiant energy is realized by positioning the recording means so that its lens node is situated laterally of the common point of intersection of the diverging beams by a measure which enables the line-of-sight rays to the lens node from all points illuminated by each beam to be substantially non-coincident with the rays from the other beams.

With the practice of the present invention, when an object is placed within the object space and the object subjected to the radiant energy beams, the irradiated surface points of the object viewable by the recording means lie along radiant energy line-of-sight rays which are unique for each of the radiant energy beams. As a result, the record made by the recording means contains unambiguous positional information enabling location of the object surface points.

In further preferred form, the present practice contemplates comparing a record made during the placement of the object in the object shape with a further reference record made with a reference object in the form of a flat plane or screen situated at the forward extent of the object space. Due to the above-described lateral positioning of the recording means lens node, each recorded line on the object record can be related to a specific recorded reference line of the reference record. Moreover, the lateral spacing between each object line and its reference line can be used to determine positional depth information of the corresponding object surface points. In further preferred form, a reference comb is also recorded at the front extent of the object space in horizontal and vertical orientation and the records of the reference comb are used to measure the lateral spacings between recorded object and reference lines and to provide further measurements from which the positional height and width information of the object points can be derived.

In a further aspect of the invention, a number of additional recording means are disposed laterally from the first recording means and these additional recording means used to record the object in the object space with the first recording means. In this form of the invention, the records made with the first recording means establish correspondence between object points and recorded reference lines, and this correspondence is used to relate the recorded object points and reference lines of the records of the other recording means. The latter records are then used to derive a more accurate representation of the positional information.

BRIEF DESCRIPTION OF THE DRAWINGS

The above and other features and aspects of the present invention will become more apparent upon reading the following detailed description in conjunction with the accompanying drawings, in which.

It should be noted that in the film records to be discussed hereinbelow, i.e., the records of FIGS. 3A through 3E, FIGS. 5A and 5B and FIGS. 7A through 7C, the normal camera reversal (left-to-right and bottom-to-top) has been removed for ease of illustration.

DETAILED DESCRIPTION

Figure 1:
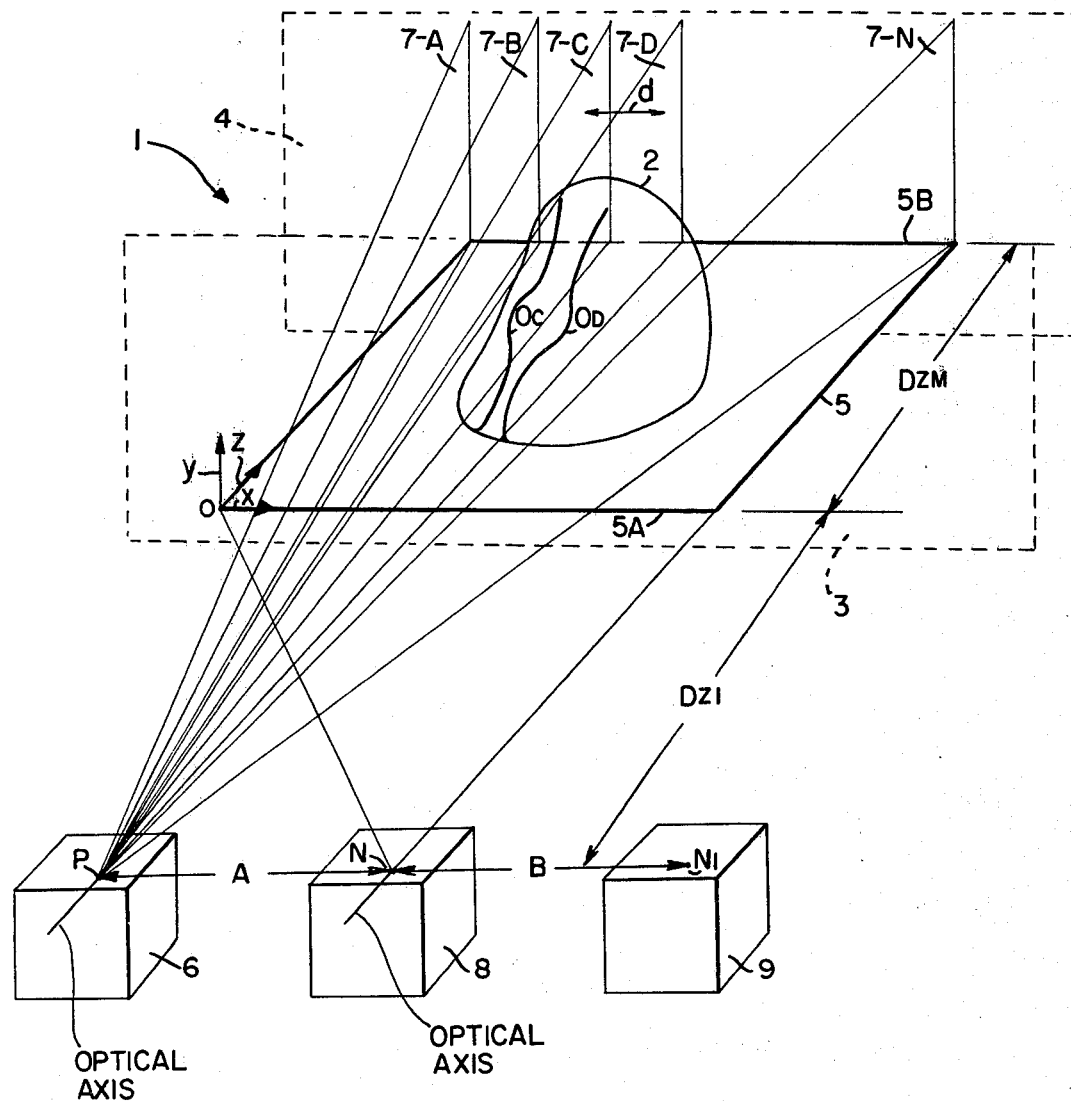
FIG. 1 illustrates a system embodying the apparatus and method of the present invention.

FIG. 1 illustrates a system embodying the method and apparatus of the present invention. An object space or volume 1 is provided for receiving an object 2 whose surface points are to be spatially determined. The object space 1 is defined by a front extent 3 and a rear extent 4 illustrated in dotted line and which, as shown, are commensurate with the front and rear edges 5A and 5B of a platform 5 provided for supporting the object. In the present illustrative case, the front and rear extents are parallel vertical planes whose spacing $D_{zm}$ is a measure of the deepest object surface point which can be measured with the system of the invention.

A point O on the front extent 3 serves as a reference point to which object surface point measurements made by the system can be referenced. The point O defines the origin of a reference spatial coordinate system depicted as x, y, z, where x, y and z correspond to surface points along the width, height and depth of the object 2 in the object space.

A projection means 6 generates in a conventional manner a plurality of substantially planar diverging laterally spaced radiant energy beams 7-A through 7-N and projects these beams into the object space 1. The beams 7-A through 7-N emanate from a common projection point P. In the case shown, the beams have been projected through equally spaced parallel slots so that the x coordinate spacing d between successive beams is equal. Typically, the projection means 6 might be a conventional slide projector having an output aperture of y coordinate extent and narrow x coordinate extent and employing a slide having laterally spaced y coordinate extending line transparencies. In such case, the radiant energy planes will be light planes emanating from the projector lens node which serves as the projection point P.

A recording means 8 is positioned to record the radiant energy applied to the object space. The recording means is defined by a lens node N whose field of view corresponds to the extent of the object space so that recording of radiant energy throughout the space is possible. Typically, the recording means 8 may be a conventional camera.

Preferably and, as shown, the recording means 8 is situated so that the lens node N is at the same y and z coordinate positions relative to the object space as the projection point P of the projection means 6. In FIG. 1, the z coordinate spacing between the front extent 3 of the object space and the point P and lens node N is given by the measure $D_{zl}$.

Further, in FIG. 1, the optical axes of the lens node N and projection point P are shown as parallel to one another and as orthogonal to the extent 3, although other conditions of these axes are within the practice of the invention.

In accordance with the invention, the recording means 8 is further positioned relative to the projection means 6 so that radiant energy receivable by the recording means as a result of each of the individual radiant energy beams in the object space is uniquely defined. More particularly, the recording means 8 is arranged with its lens node N laterally spaced from the projection point P by a measure A for which radiant energy line-of-sight rays from the lens node N to all points in each radiant energy beam in the object space are non-coincident with those rays arising from points in the other radiant energy beams. In this way, the radiant energy in the object plane receivable by the recording means 8 is unique in character and, thus, capable of providing unambiguous spatial information regarding surface points on the object 2.

Figure 2:
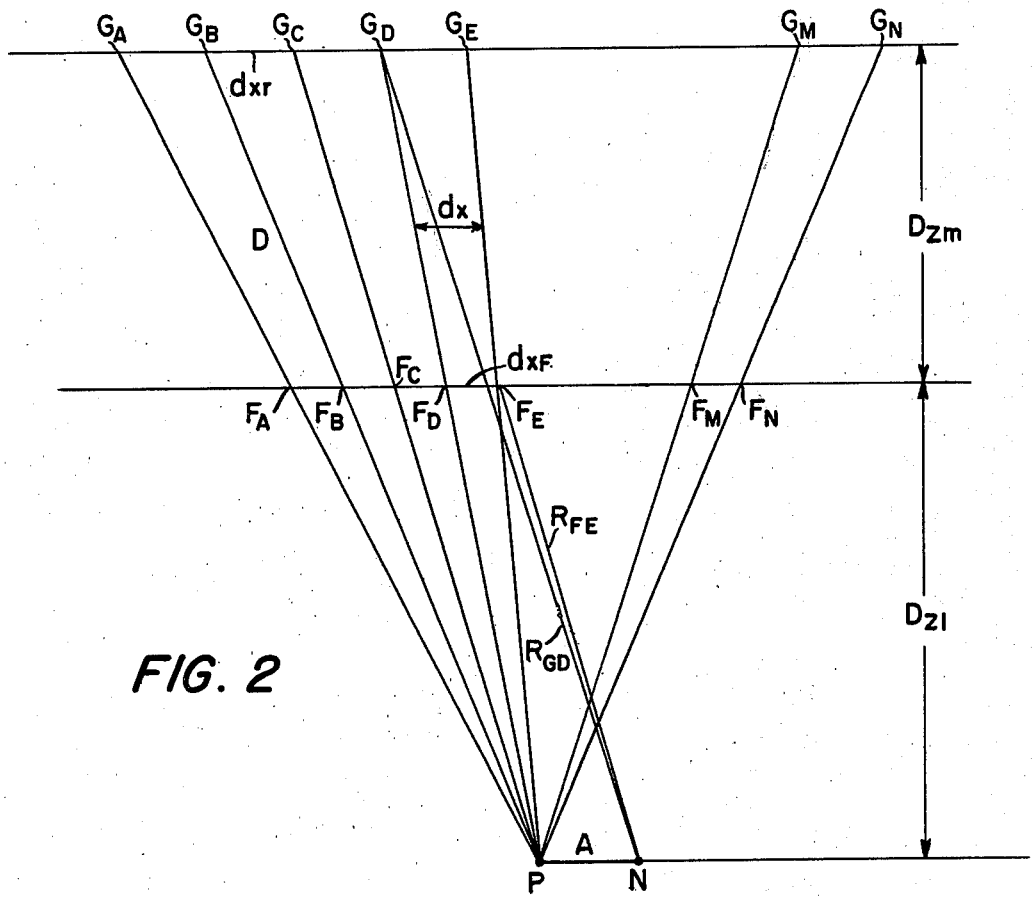
FIG. 2 shows a plan view of radiant energy beams incident on the object space of FIG. 1 as seen by the recording means of FIG. 1.

FIG. 2 illustrates the manner of determining the lateral measure A to ensure the above-mentioned unique character of the radiant energy beams relative to the lens node N. In particular, FIG. 2 is a view of the object space 1 from above with the object 2 removed and the radiant energy beams 7-A through 7-N of the projector means 6 passing therethrough. As can be seen, the beams 7-A to 7-N confront the front extent 3 of the object space 1 at points $F_A$ to $F_N$ of equal lateral spacing $d_{xf}$ and the rear extent 4 at points $G_1$ to $G_N$ of equal lateral spacing $d_{xr}$. To ensure that the radiant energy receivable from the object space at the lens node N from each point of radiant energy beams is unique in character, it can be appreciated that the lateral measure A must be such that the line-of-sight rays from the points in the beams to the node be non-coincident. This will occur if A is selected such that the line-of-sight ray from each rear confrontation point does not coincide with or cross the front extent laterally rightward of the line-of-sight ray from the front confrontation point of the next succeeding radiant energy beam. Thus, for example, the line-of-sight ray $R_{GD}$ from the rear confrontation point $G_D$ of the beam 7-D to the node N cannot coincide with or cross the front extent rightward of the line-of-sight ray $R_{FE}$ from the front confrontation point $F_E$ of the beam 7-E. If the latter condition exists, then there is no possibility of ambiguity (i.e., no possibility of confusing line-of-sight rays from different beams) and the radiant energy received by the recording means 8 can be reliably depended upon to give unique spatial information.

It can be shown that for the present illustrative situation where the beams 7-A through 7-N are equally spaced along both the front and rear extents 3,4 (which are parallel to each other) that the above condition or uniqueness will be obtained if the lateral measure A satisfies the following relationship.

$$A < D_{zl}/D_{zm} \cdot d_{xr} \tag{1}$$

While the above relationship thus permits a number of values for the lateral measure A, it is preferred that A be selected as close as possible to the value $(D_{zl}/D_{zm}) \cdot d_{xr}$, while still maintaining the uniqueness of the line-of-sight rays. In this manner, maximum resolution of spatial information will be preserved by maximizing the angle between the intersection of the camera ray and the projector beam. A particularly preferred value for the measure is $(1 - 2/N)$ times the factor $(D_{zl}/D_{zm}) \cdot d_{xr}$, where N is the number of discernable elements $d_{xr}$ can be broken into given the overall resolving power of the measuring system. This insures that the distance A is small enough to prevent ambiguity due to the presence of errors caused by finite system resolution.

For conditions where the object space 2 is not defined by parallel rear and front extents and/or the radiant energy beams are not equally diverging, the measure A will differ from that of the above expression. In general, the measure A will depend upon the particular angular divergences and rear and front extent configurations involved. Typically, it can be determined by a radiant energy ray diagram wherein a ray is drawn from the rear confrontation point of each radiant energy beam through the front confrontation point of the next successive beam. The distance between the ray which passes the closest to the projection point P, and the point P will define the measure A. In this case, the recording means should again be laterally displaced from the point P by an amount as close as possible to the measure A while still preserving the uniqueness of the line-of-sight rays.

Having situated the recording means 8 at a lateral spacing A defined by the expression (1), spatial information regarding the surface points of the object 2 can now be uniquely determined. In the practice of the present invention, this information is derived by making a number of records of the object space with the radiant energy applied. In preferred form, at least two records are made, and these records are utilized to derive at least the z coordinate positions of the object surface points.

Figure 3A:
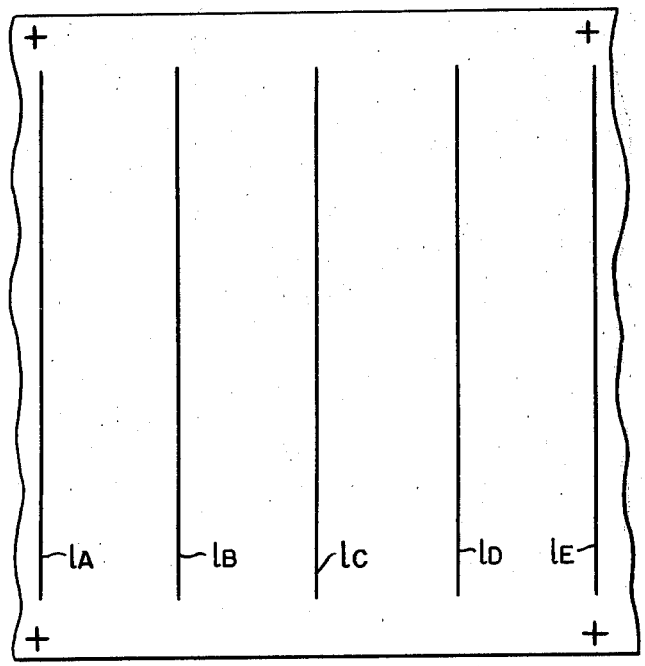
FIGS. 3A and 3B illustrate records made of objects placed in the object space of FIG. 1.
Figure 3D:
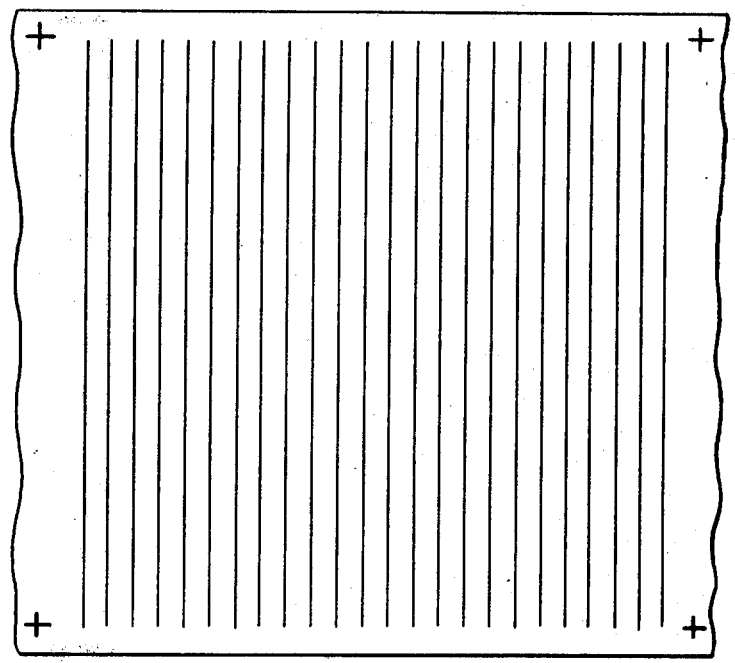
FIGS. 3D and 3E show further records made with a reference comb structure situated in the object space of FIG. 1.
Figure 3E:
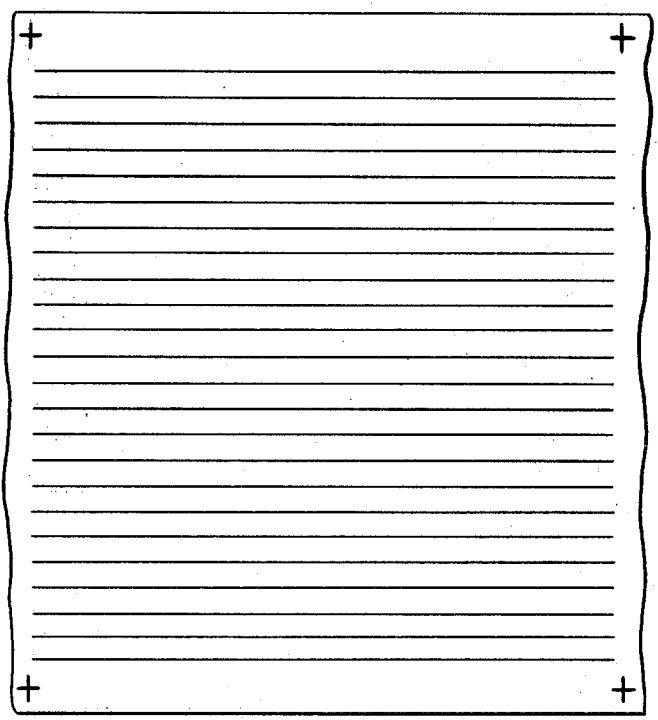
Figure 3B:
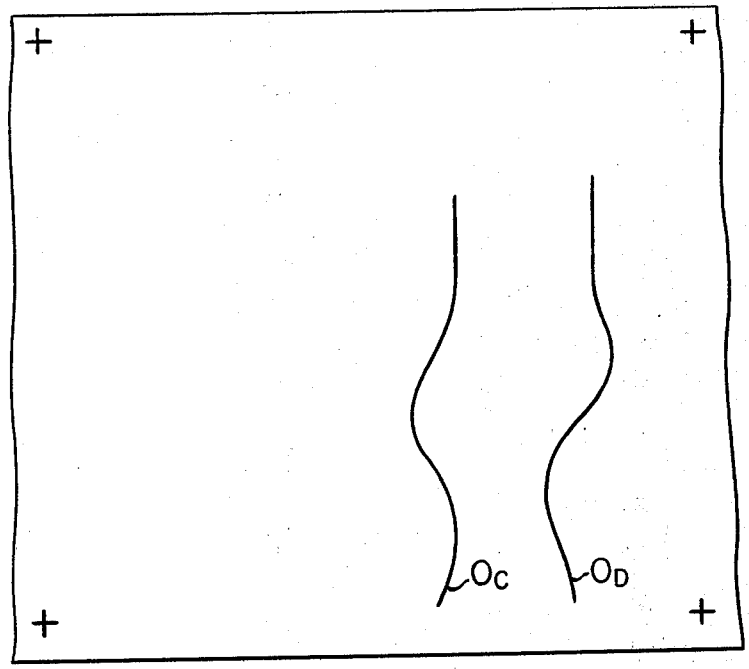

More particularly, a first record is made by placing a reference object having no depth such as, for example, a flat screen, at the front extent 3 of the object space 1 and subjecting same to the radiant energy beams 7-A through 7-N. The resultant reference record is shown in FIG. 3A and comprises reference lines corresponding to the confrontation of the radiant energy beams with the reference screen at the front extent. As can be appreciated, these reference lines provide a measure of the front confrontation points $F_1$ to $F_N$ as seen by the recording means 8. Subsequent to this first recording, a second recording is made this time with the object 2 being subjected to the radiant energy planes. FIG. 3B shows this second recording. It too comprises a number of lines, in this case object lines, each of which corresponds to a continuum of object points confronted by one of the radiant energy beams.

For simplification purposes, FIG. 3A only shows the reference lines $1_A$ through $1_E$ corresponding to the confrontation of the reference object by the beams 7-A through 7-E. Similarly, FIG. 3B only shows the object lines resulting from the aforesaid beams, there being only two such lines $O_C$, $O_D$ as seen from FIG. 1. As will be developed more fully hereinbelow, each of the object lines in the record of FIG. 3B is related to a specific reference line of FIG. 3A and with that reference line defines unique information from which the z coordinate positional information of the points on that object line can be derived.

Figure 4:
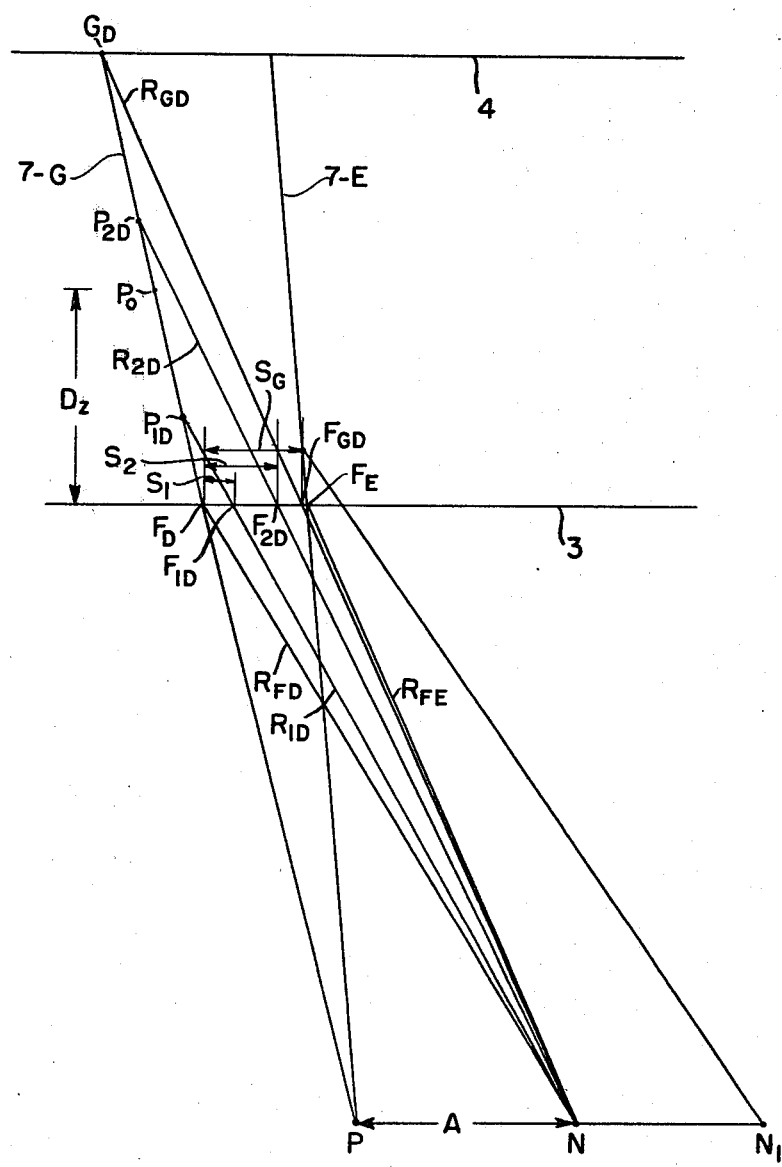
FIG. 4 illustrates an enlarged portion of FIG. 2 showing line-of-sight radiant energy rays from various points in the object space of FIG. 1 to the lens node of the recording means of FIG. 1.

More particularly, as already discussed above, disposition of the recording means 8 so the lens node N is displaced from the projection point P by the measure A, as given by the expression (1), causes the line-of-sight rays from the lens node to the points in the radiant energy beams 7-A through 7-N to be non-coincident. Due to this non-coincident condition, each line-of-sight ray from a point in a given beam is situated between the line-of-sight ray from the front confrontation point of that beam and the line-of-sight ray from the front confrontation point of the next successive beam. This is readily apparent from FIG. 4, which is an enlarged view of a portion of FIG. 2. As shown, a number of line-of-sight rays $R_{1D}$, $R_{2D}$, $R_{GD}$ from points $P_{1D}$, $P_{2D}$ $G_D$ in the beam 7-D are confined between the ray $R_{FD}$ from the front confrontation $F_D$ of the beam and the ray $R_{FE}$ from the front confrontation point $F_E$ of the next successive beam 7-E. A line-of-sight ray from a given plane thus necessarily crosses the front extent 3 of the space 1 between its corresponding front confrontation point and the front confrontation point of the next succeeding beam and at a unique rightward lateral spacing S from the former point. Thus, again looking at FIG. 4, the line-of-sight rays $R_{1D}$, $R_{2D}$ and $R_{GD}$ cross the front extent 3 at points $F_{1D}$, $F_{2D}$, $F_{GD}$ which are between the confrontation points $F_D$ and $F_E$ and spaced laterally rightward from the former point $F_D$ at unique lateral spacings $S_1$, $S_2$, $S_G$, respectively.

Figure 3C:
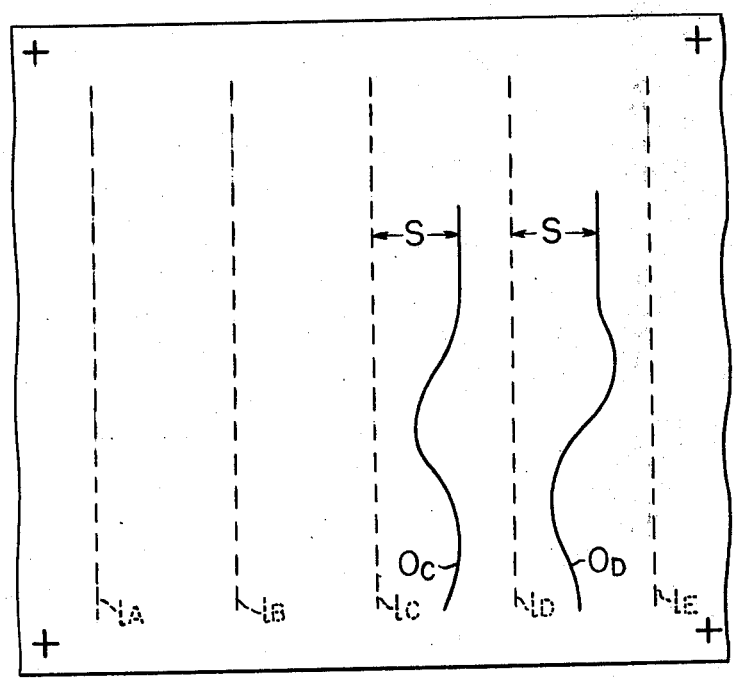
FIG. 3C illustrates the superposition of the records of FIGS. 3A and 3B.

Based on the above, it will be appreciated that an object record line corresponding to the configuration of a given one of the beams 7-A through 7-N with the object 2 will necessarily lie between reference record lines corresponding to the front confrontation points of the given beam and next successive beam. Moreover, the points on such object record line will lie laterally rightward at record distances (m×S) of the reference record line corresponding to the given beam, where m is the magnification of the recording means 8 and S corresponds to the unique lateral spacings between the front confrontation points of the given beam and the points in the front extent crossed by the line-of-sight rays from the object points confronted by the beam. Superposition of the object record of FIG. 3B over the reference object record of FIG. 3A thus situates the object record line $O_C$ resulting from the plane 7-C between the reference record lines $1_C$ and $1_D$ and the object record line $O_D$ resulting from the plane 7-D between the reference record lines $1_D$ and $1_E$. This is shown in FIG. 3C, the reference record lines being illustrated in dotted line. Furthermore, the points of the lines $O_C$ and $O_D$ are situated laterally rightward at record distances (m×S) from the corresponding reference lines $1_C$ and $1_D$ respectively.

Comparison of records of FIG. 3A and FIG. 3B and knowledge of the magnification m thus enables the determination of a unique lateral spacing S for each recorded object point. From this lateral spacing, the z coordinate spatial location of the object point can then be uniquely determined. More particularly, in the present illustrative case, it can be shown by similar triangles from FIG. 4 that the z coordinate position $D_z$ of a given recorded object point is related to the lateral spacing S of that point as follows.

$$D_z = \frac{(S/A) \cdot D_{zl}}{1 - (S/A)} \quad (2)$$

Use of the records of FIG. 3A and FIG. 3B and the magnification m to determine the lateral spacings S for the object points on the object record lines, and the insertion of such values into expression (2), will thus enable unique determination of the z coordinate positions of all the object points.

In order to facilitate the above determination of the lateral spacings S from the records of FIGS. 3A and 3B without knowledge of the recording means magnification m and to further enable determination of the x and y coordination positions of the recorded object points, the preferred form of the invention contemplates the making of an additional record or records at the front extent 3 which serve as a calibrated measurement scale. The desired records are as shown in FIGS. 3D and 3E and can be made by recording a radiant energy comb structure having a predetermined fine element spacing and situated first vertically and then horizontally at the forward extent. In the present case, the comb structure has been recorded in both instances with its initial element at the reference pont O and, as a result, determinations made with these records will be automatically referenced to this point. An alternative to the records of FIGS. 3A and 3B would be a single composite record formed by a radiant grid structure.

Superposition of the records of FIGS. 3A and 3B on the records of FIGS. 3D and 3E thus provides vertical record lines of known calibrated spacing to which the object record lines and the reference record lines can be referenced. The lateral spacings S' and S" corresponding to the respective points on the aforesaid object records can therefore now be readily determined. Furthermore, as above-noted, the reference records of FIGS. 3D and 3E enable the determination of the x and y coordinate positions of each recorded object point and, thus, with these further records the spatial location of each recorded object point is complete.

Figure 5A:
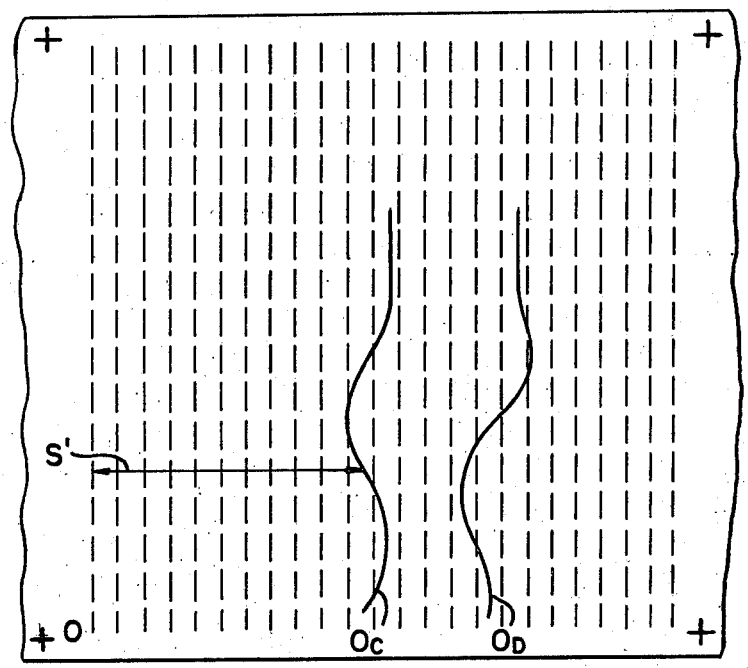
FIGS. 5A and 5B show superposition of the record of FIG. 3B on the records of FIGS. 3D and 3E.
Figure 5B:
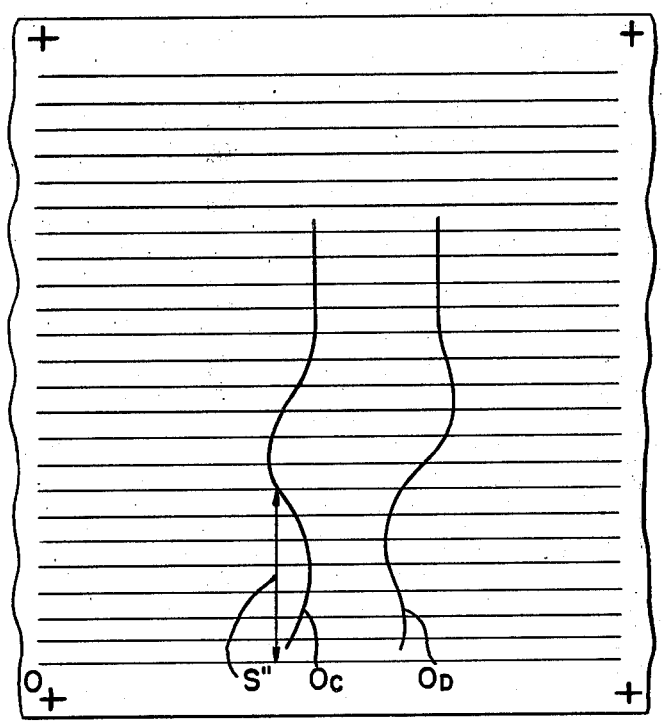
Figure 8A:
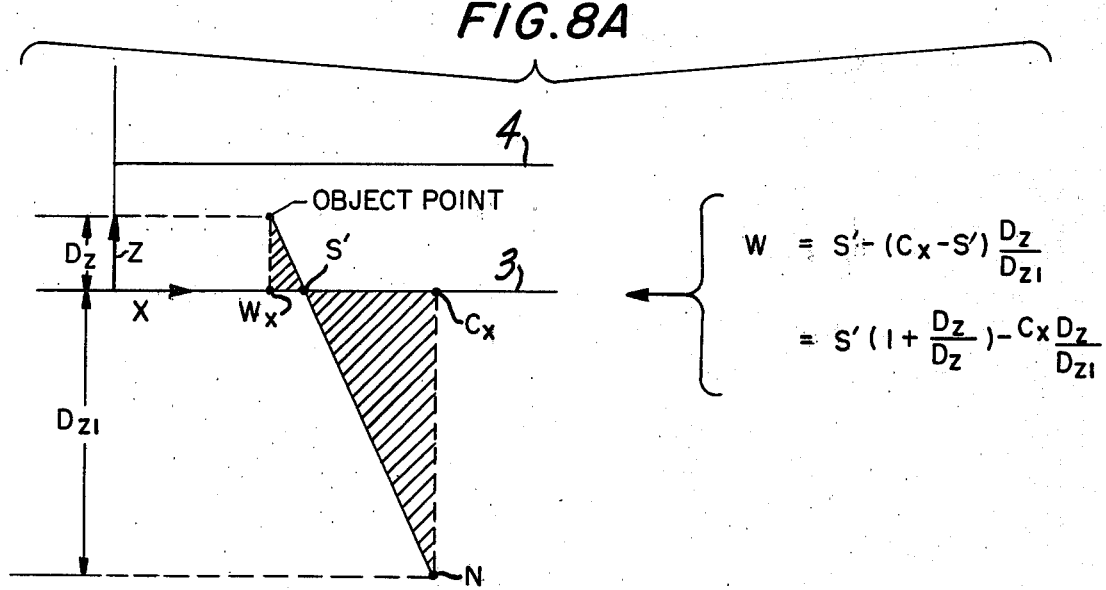
FIGS. 8A through 8C illustrate diagrammatic plan, front and side views of the FIG. 1 system from which positional equations can be derived.
Figure 8B:
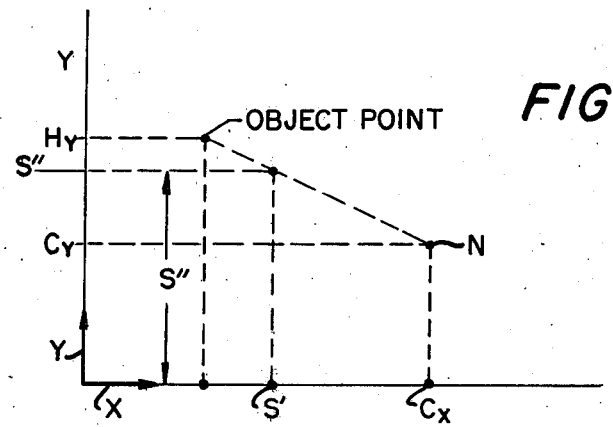
Figure 8C:
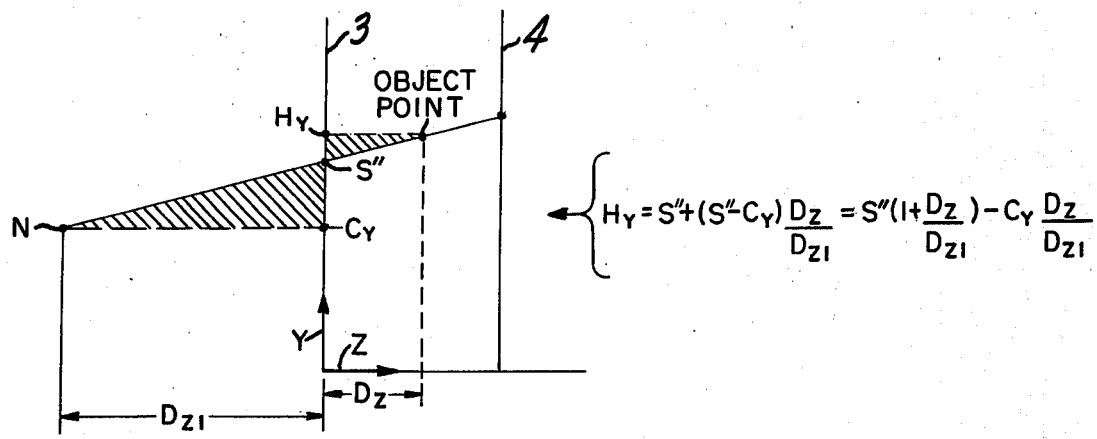

More particularly, superposition of the record of FIG. 3B on the record of FIG. 3D permits the determination of a corresponding lateral measure S' for each object point on each line, as shown in FIG. 5A, while superposition of the record of FIG. 3B on the record of FIG. 3E permits the determination of a corresponding vertical measure S" for each object point, as shown in FIG. 5B. By application of the rules of similar triangles, as was done in the z coordinate case, the x and y coordinate positions can now be determined from the measures S' and S" for the object points. In particular in the present illustrative case, the x and y coordinate positions $W_x$ and $H_y$ of each object point can be determined from the following expressions which can be derived from the similar triangles shown shaded in FIGS. 8A through 8C.

$$W_x = S'(1 + D_z/D_{z1}) - C_x(D_z/D_{z1}) \quad (3)$$

$$H_y = S''(1 + D_z/D_{z1}) - C_y(D_z/D_{z1}) \quad (4)$$

The terms $C_x$ and $C_y$ in expressions (3) and (4) are the x and y coordinate positions of the lens node N and can be determined in any conventional manner. Examples of practices for making this determination can be found in U.S. Pat. Nos. 3,962,588 and 3,936,649. Moreover, the practice in the latter patents can also be used to electronically determine the positions of the points on the lines of records of FIGS. 3A through 3E, from which the parameters S, S' and S" can be ascertained for ultimate calculation of the coordinates $D_z$, $W_x$ and $H_y$.

It should be noted that the accuracy achievable with the system and method of the present invention is dependent upon the measure A and the distance $D_{z1}$. In general, the smaller $D_{z1}$ is made, the more accurate will be the determinations, since the greater will be the magnification of the recording means 8. On the other hand, the larger the measure A within the constraints of the expression (1) again the more accurate will be the spatial determinations. This is so because the larger the measure A, the larger will be the lateral spacing values S used to calculate the z coordinate positions of the recorded object points. Inaccuracies in these larger values of S will, therefore, contribute less of an inaccuracy to the calculated z coordinate than similar inaccuracies where smaller values of S are employed.

In situations where accuracy demands are greater than can be provided by the system of FIG. 1, the system can be modified to provide the required accuracy. In accordance with the invention, this is accomplished by placement of a second recording means in aligned laterally displaced orientation with the first recording means 8 and operating this second recording means in unison with the first means. This is shown in FIG. 1 by the recording means 9 which is disposed so that its lens node $N_1$ is displaced by a measure B from the recording means 8. The lens node $N_1$ is thus laterally displaced from the projection point P by the measure (A+B), where the measure (A+B) is greater than $(D_{z1'}/D_{z-m}) \cdot d_{xr}$ so that the camera means 9 provides greater measurement accuracy than the maximum measurement accuracy achievable with the recording means 8.

Figure 6:
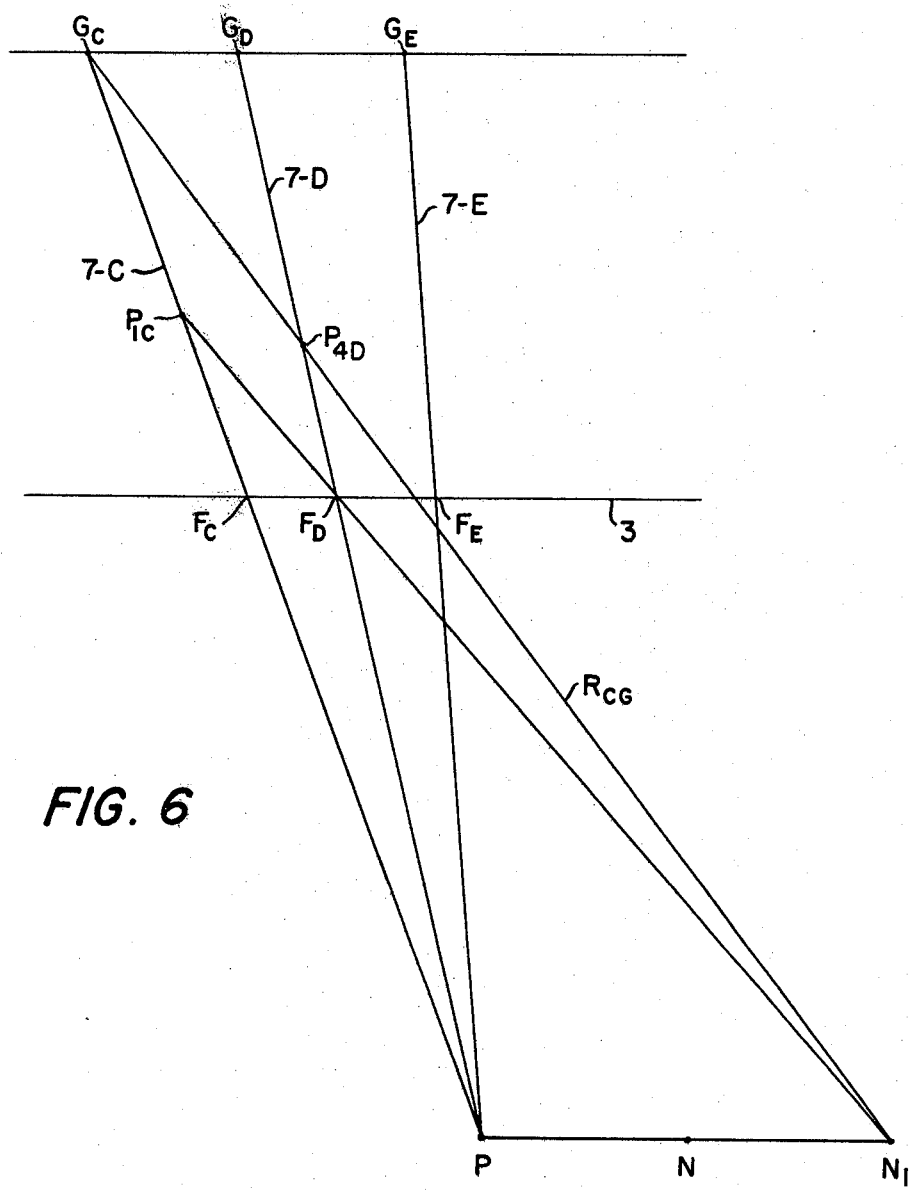
FIG. 6 shows a further enlarged view of a portion of FIG. 2 depicting line-of-sight radiant energy rays from points in the object space to the lens node of a further recording means employed in the system of FIG. 1.

While placing the lens node $N_1$ of the recording means 9 at this position increases measurement accuracy, it also causes coincidence of at least some of the line-of-sight rays arriving at the node $N_1$ from the points in the beams 7-A through 7-N. These rays, therefore, will no longer uniquely define their corresponding object points. More particularly, prior to reaching the front extent 3, line-of-sight rays directed to the node $N_1$ from points in each radiant energy beam will cross the plane of the next successive beam. As a result, these rays will now intersect the front extent at points displaced laterally rightward of both their corresponding front confrontation point and the front confrontation point of such next successive beam. Overlap or coincidence of at least some of these rays with those of the latter beam will therefore occur. This is illustrated in FIG. 6 which shows in enlarged fashion the portion of FIG. 2 containing the beams 7-C through 7-E. As can be seen, rays from points along the beam 7-C rearward of the point $P_{1C}$ (i.e., between $P_{1C}$ and $G_C$) to the lens node $N_1$ now cross the front extent 3 laterally rightward of both their corresponding front confrontation point $F_C$ and the front confrontation point $F_D$ of the next successive beam 7-D. These crossover rays now coincide or overlap the rays to the node $N_1$ from points along the beam 7-D between the points $F_D$ and $P_{4D}$. Thus, radiant energy to the lens node $N_1$ from these overlapping rays no longer uniquely defines points on a particular beam and a record made thereof cannot itself now be used to identify irradiated object points in the object space 1.

Figure 7A:
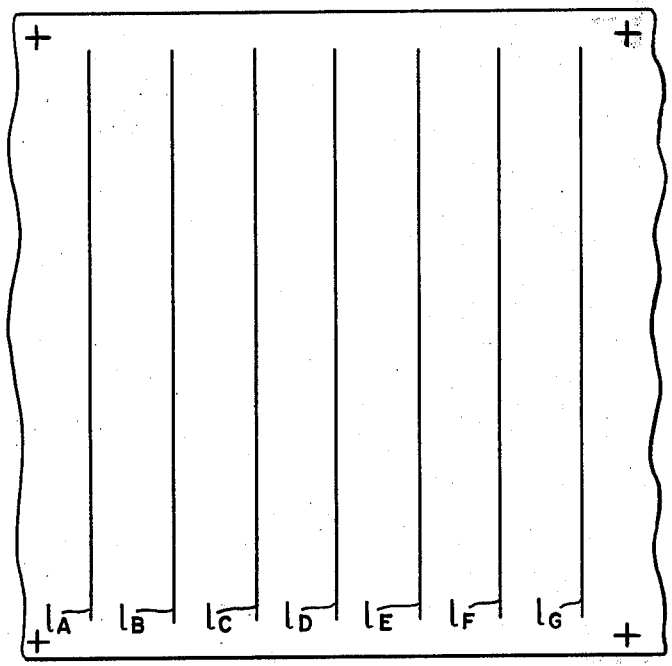
FIGS. 7A and 7B illustrate records made with the further recording means employed in the system of FIG. 1.

More specifically, based on the above, it is apparent that each object record line of the object record made with the recording means 9 will not be exclusively between its corresponding reference line and that of the next successive beam. This is shown in FIG. 7C which depicts the superposition of the reference and object records (FIGS. 7A and 7B) of the means 9 analogously to the superimposed records of the means 8 shown in FIG. 3. Thus it is no longer possible to determine solely from viewing the object and reference records which reference line is the corresponding reference line of a particular object line. Determination of the lateral spacings S for calculating the z coordinate positions of the object points is, therefore, also no longer possible. In order to utilize the records of the recording means 9 to more accurately locate the object points further information is thus needed.

This information can be obtained from the known dimensional configuration of the system as depicted in FIGS. 2 and 6. Thus, from FIG. 6, it can be observed that positioning of the lens node $N_1$ at the lateral measure (A+B) results at most in the shift of a line-of-sight ray from any one beam in the front extent to less than two confrontation points from the confrontation point of that beam. This is evident from the line-of-sight ray $R_{CG}$ from the rear confrontation point $G_C$ which crosses the front extent beyond the front confrontation point $F_D$ but before the front confrontation point $F_E$. This means that any one object point of the object record of FIG. 7A might be shifted at most from its corresponding reference line laterally rightward by less than two reference lines. Each object point in the object record of FIG. 7B can thus have as its corresponding reference line one or the other of the two reference lines immediately to its lateral left.

Having thus determined from the system configuration, the number of reference lines laterally leftward of each object point which might be the corresponding reference line for that point for the given lateral displacement B, the records of FIGS. 7A and 7B can now be used to determine the coordinate positions for the recorded object points as follows. First, the lateral spacings S for each recorded object point are determined with respect to the reference lines which might be possible reference lines for that particular point. Thereafter, the values of S' and S'' for the particular object point are determined using the record of FIG. 7A and the records of the comb structure recorded with the recording means 9. The possible values of S and the values of S' and S'' are then used to calculate new sets of coordinate values $D_{z1}$, $H_{z1}$, and $W_{y1}$. Each new set of the calculated coordinate values for a given point correspond to the reference line used to calculate them, and each new set is then compared to the prior sets of coordinate values determined with respect to their respective reference line from the records of the recording means 8. When a close correspondence is found between a new set of coordinate values of an object point and a prior set of values for that point, the sets of values correspond. Moreover, since the new set is more accurate as a result of the positioning of the recording means 9, it replaces the prior set as the true positional coordinates of the particular point.

Figure 7B:
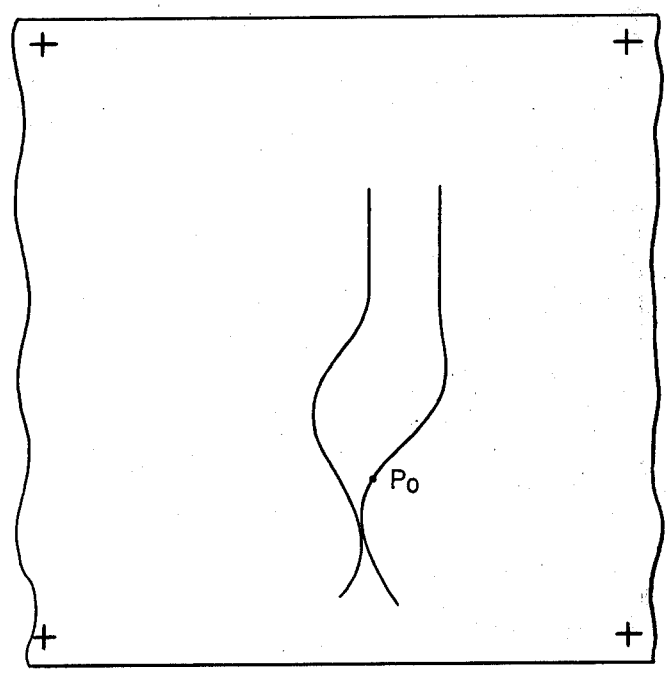
Figure 7C:
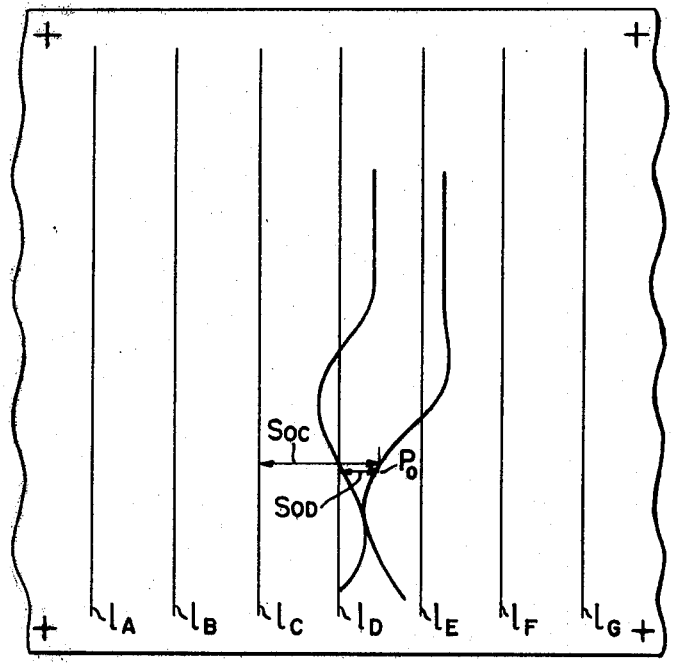
FIG. 7C illustrates a superposition of the records of FIGS. 7A and 7B.

Thus, for example, the object point $P_O$ in the record of FIG. 7B can have as possible reference lines the two reference lines to its immediate left, i.e., the reference lines $l_D$ and $l_C$ as shown in FIG. 7C. To determine the coordinate positions for the point $P_O$, the possible values of S relative to the lines $l_C$ and $l_D$, $S_{OC}$ and $S_{OD}$, are determined. Likewise, in a similar manner as discussed above, the values of S' and S'' for the point $P_O$, $S'_O$ and $S''_O$, are also determined. The values of $S_{OC}$ and $S_{OD}$ and the values of $S'_O$ and $S''_O$ are then used to calculate two new sets of coordinate values $D_{z1C}$, $H_{y1C}$, and $W_{x1C}$ and $D_{z1D}$, $H_{y1D}$ and $W_{x1D}$ discussed above from the expressions (2), (3), and (4). The first new set of values $D_{z1C}$, $H_{y1C}$ and $W_{x1C}$ are then compared with the prior sets of $D_z$, $H_y$ and $W_x$ values determined from the records of FIGS. 3A and 3C using the corresponding reference line $l_C$. If a prior set of values is reached which are close to the new set of values, then this prior set of values will represent the corresponding set of positional coordinates determined for the point $P_O$ with the recording means 8. Since the new set of values $D_{z1C}$, $H_{y1C}$ and $W_{x1C}$ are more accurate, they will replace the prior set as the true coordinates of the point $P_O$. If this comparison does not result in a close match between sets of values, this means that the reference line $l_C$ was not the corresponding reference line to the point $P_O$ and, therefore, that the values $D_{z1C}$, $H_{y1C}$ and $W_{x1C}$ are not true coordinates of such point. If this occurs, then a second comparison is made this time between the new set of values $D_{z2D}$, $H_{y2D}$ and $W_{x2D}$ and the prior set of values determined with the recording means 8 using the correspondence reference line $l_D$. When the prior set of values is reached which is close to the new set, again correspondence is found, and the new set will replace the prior set as the more accurate representation of the point $P_O$.

While the above procedure is one method of utilizing the records of the recording means 9 to obtain a more accurate determination of the positional locations of the object points in accord with the invention, an alternative preferred procedure will now be described. In this procedure, the prior values of the object points determined using the reference records of the means 8 are first used to estimate or predict the positions at which the line-of-sight rays from these points to the lens node $N_1$ will cross the front extent 3 of the object space. This provides calculated S' and S'' values, $S'_1$ and $S''_1$, for the line-of-sight ray from each prior set of coordinate values to the node $N_1$. Since each prior set of coordinate values was determined with reference to a specific reference line, the values of $S'_1$ and $S''_1$ for each set will have the same reference line. Hence, each calculated set of $S'_1$ and $S''_1$ values will have a known reference line.

The object record of FIG. 7B is then used with the reference comb records recorded with the recording means 9 to determine the values of S' and S'' for each point on the object record of the recording means 9 in a similar manner as discussed above for the means 8. The values of S' and S'' obtained from these records are then compared with calculated values $S'_1$, $S''_1$. When a close correspondence is determined between a set of values determined from the object record and a set of calculated values, then the sets of values will correspond to the same object point. The reference line for the calculated set of values will thus be the reference line for this set of record values and, accordingly, the recorded object point corresponding thereto. Hence, the reference line for this recorded object point will have been ascertained. Continued comparison of the calculated $S'_1$ and $S''_1$ values with the values determined from the object record will thus enable each corresponding reference line of each object point to be determined.

Once each reference line of each recorded object point is found, the values of lateral spacing S for the object points can be determined and from these values and the previously determined values of S' and S'', the values of $D_z$, $H_y$ and $W_x$ can then be calculated in the same manner as discussed above for the records of the recording means 8. The resultant determined positional values will, of course, be more accurate than those previously determined, due to the positioning of the record means 9.

Still further accuracy for the positional locations of the object points can be obtained by using further recording means spaced laterally at successively larger measures from the projection point P and by repeating one or the other of the above procedures for determining the positional locations from recorded records. The number of recording means actually used will, of course, depend on the accuracy desired, and the number can be increased until this accuracy is realized.

In addition, if desired, one recording means may be used sequentially in each of the desired positions so that the accuracy enhancement achieved with multiple recording camera positions is accomplished with only one camera.

In all cases, it is understood that the above-described arrangements are merely illustrative of the many possible specific embodiments which represent applications of the present invention. Numerous and varied other arrangements can readily be devised in accordance with the principles of the present invention without departing from the spirit and scope of the invention.

What is claimed is:

1. Apparatus for determining spatial information relating to an object adapted to be situated within an object space having predefined front and rear extents comprising:

means for applying substantially planar diverging laterally spaced radiant energy beams to said object space, said beams having common point of intersection;

means for recording radiant energy in said object space, said recording means being positioned so that radiant energy from all points along each of said beams in said space and receivable thereby is uniquely defined, said recording means recording the confrontation of said radiant energy beams with a flat reference plane at said front extent and with said object in said object space;

and means for utilizing the records of said recording means including the records of said reference surface and said object to derive information for determining the spatial positions of points on said object.

2. Apparatus in accordance with claim 1 wherein:

said recording means records a calibrated comb structure disposed in orthogonal dispositions at said front extent;

and said means for utilizing further employs said records of said comb structure to derive said information.

3. Apparatus in accordance with claim 1 further comprising:

a number of further recording means for recording the radiant energy in said object space, each of said further recording means being disposed so that radiant energy from at least some of the points along said beams in said space and receivable thereby is non-uniquely defined.

4. Apparatus in accordance with claim 3 wherein:

each of said number of further recording means includes a lens node which is laterally spaced from the projection point P by a measure for which line-of-sight rays to that lens node from at least some of the points of said radiant energy beams coincide.

5. Apparatus in accordance with claim 3 further comprising:

means for utilizing the records of said recording means and the records of said number of additional recording means to derive information for determining the spatial positions of points on said object.

6. A method for determining spatial information related to an object adapted to be situated within an object space having predefined front and rear extents comprising:

applying substantially planar diverging laterally spaced radiant energy beams to said object space, said beams having a common point of intersection, said step of applying including:

projecting said radiant energy beams onto a flat reference plane disposed at said front extent;

and projecting said radiant energy beams onto said object in said object space;

recording radiant energy in said object space from a first position at which radiant energy from points along said beams in said space is uniquely defined, said step of recording including:

recording the confrontation of said radiant energy beams and said reference plane in a first record;

and recording the confrontation of said radiant energy beams and said object in a second record;

and utilizing said first and second records to derive information for determining the spatial positions of the object points confronted by said beams.

7. A method in accordance with claim 6 wherein:

said step of utilizing comprises:

determining the spacings between recorded object points on said second record and corresponding recorded lines on said first record;

and calculating with said spacings a first spatial coordinate for each of said recorded object points.

8. A method in accordance with claim 7 wherein:

said step of recording further comprises:

recording a calibrated comb structure in vertical and horizontal disposition at said front extent in third and fourth records; and said step of utilizing further comprises:

determining the horizontal and vertical positions of said recorded object points of said second record on said third and fourth records;

and calculating with said determined horizontal and vertical positions and said first calculated spatial coordinate of each recorded object point second and third spatial coordinates of that recorded object point.

9. A method for determining spatial information related to an object adapted to be situated within an object space having predefined front and rear extents comprising:

applying substantially planar diverging laterally spaced radiant energy beams to said object space, said beams having a common point of intersection, said step of applying including:

projecting said radiant energy beams onto a flat reference plane disposed at said front extent;

and projecting said radiant energy beams onto said object in said object space;

recording radiant energy in said object space from a first position at which radiant energy from points along said beams in said space is uniquely defined and from a number of further positions for which radiant energy from at least some of the points along said beams in said space is non-uniquely defined, said step of recording from said first position and recording from said further positions each comprising:

recording the confrontation of said radiant energy beams and said reference surface in a first record;

recording the confrontation of said radiant energy beams and said object in a second record;

and recording a calibrated comb structure in vertical and horizontal disposition at said front extent in third and fourth records;

and utilizing the records recorded at said first and at said number of further positions, including the first, second, third and fourth records recorded at each of said first and additional positions, to derive information for determining the spatial positions of points on said object.

* * * * *